(12) United States Patent
Watase

(10) Patent No.: US 8,360,190 B2
(45) Date of Patent: Jan. 29, 2013

(54) TWO-WHEELED MOTOR VEHICLE

(75) Inventor: Yuji Watase, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 13/264,186

(22) PCT Filed: Apr. 15, 2009

(86) PCT No.: PCT/JP2009/057600
§ 371 (c)(1),
(2), (4) Date: Oct. 13, 2011

(87) PCT Pub. No.: WO2010/119530
PCT Pub. Date: Oct. 21, 2010

(65) Prior Publication Data
US 2012/0043151 A1   Feb. 23, 2012

(51) Int. Cl.
*B62D 61/02* (2006.01)
*B62H 1/02* (2006.01)
(52) U.S. Cl. ......... 180/230; 180/219; 280/293; 280/296
(58) Field of Classification Search ................. 180/219, 180/230; 280/293, 295, 296; 474/28
See application file for complete search history.

(56) References Cited

U.S. PATENT DOCUMENTS

| 4,093,264 | A  | * | 6/1978 | Ishihara et al. ............... 280/296 |
| 8,147,370 | B2 | * | 4/2012 | Nakajima et al. ............. 475/210 |
| 2006/0068953 | A1 |   | 3/2006 | Tsukada et al. |
| 2006/0162979 | A1 |   | 7/2006 | Usukura et al. |
| 2007/0200315 | A1 |   | 8/2007 | Ogawa et al. |
| 2008/0252041 | A1 | * | 10/2008 | Safarik et al. ................ 280/293 |
| 2012/0035009 | A1 | * | 2/2012 | Mano ............................. 474/28 |

FOREIGN PATENT DOCUMENTS

| JP | 05-221353 | A | 8/1993 |
| JP | 2006-097756 | A | 4/2006 |
| JP | 2006-199252 | A | 8/2006 |
| JP | 2007-230347 | A | 9/2007 |

OTHER PUBLICATIONS

Official Communication issued in International Patent Application No. PCT/JP2009/057600, mailed on Jun. 2, 2009.

* cited by examiner

Primary Examiner — Anne Marie M Boehler
(74) Attorney, Agent, or Firm — Keating & Bennett, LLP

(57) ABSTRACT

A two-wheeled motor vehicle prevents a belt from slipping in a continuously variable transmission even when support by a center stand is released and a rear wheel thus lands while spinning. The two-wheeled motor vehicle includes a hydraulic continuously variable transmission that transmits torque via a belt, and a control device includes a stand position obtaining unit that obtains position information about the center stand, and an add-at-support-position unit that increases oil pressure generated in a primary oil chamber and a secondary oil chamber by a predetermined amount when the center stand is at the support position.

7 Claims, 6 Drawing Sheets

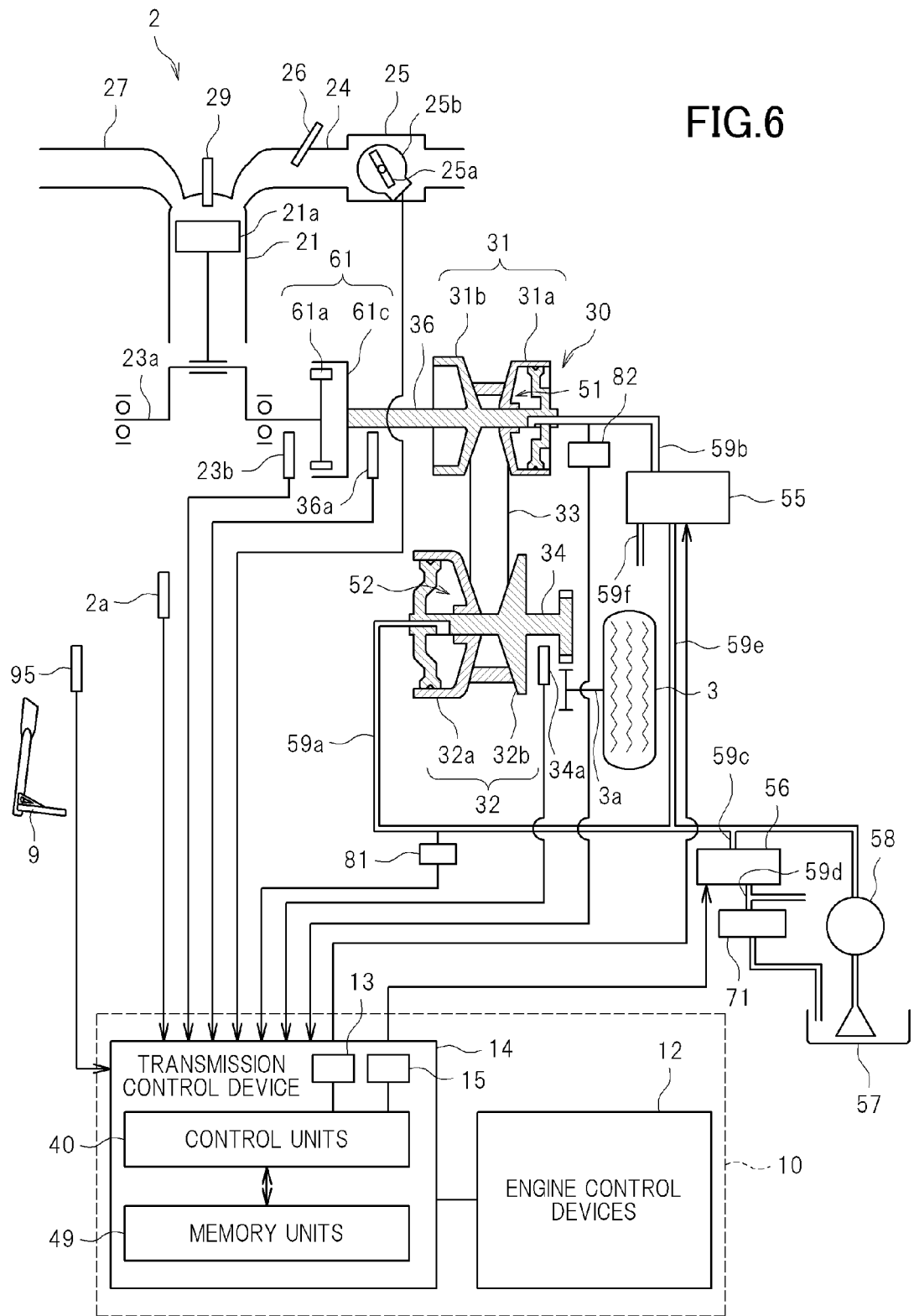

TWO-WHEELED MOTOR VEHICLE

BACKGROUND OF THE INVENTION

1. Field of the Invention

The present invention relates to two-wheeled motor vehicles including a belt-type continuously variable transmission.

2. Description of the Related Art

Some two-wheeled motor vehicles have a center stand for supporting the vehicle body while keeping the rear wheel, which is a driving wheel, floating above the ground. For such a two-wheeled motor vehicle, when the acceleration grip is operated while the vehicle body is supported by the center stand, the rear wheel will spin. Then, when the support by the center stand is released and the rear wheel thus lands while spinning, an abrupt change will occur to the torque in the torque transmission path to the rear wheel.

The above mentioned abrupt change in torque causes a belt slip in a two-wheeled motor vehicle having a belt-type continuously variable transmission. In a hydraulic continuously variable transmission for transmitting torque via a metallic belt, in particular, belt slip is not preferable in view of durability of a belt and a pulley.

SUMMARY OF THE INVENTION

In view of the above described situation, preferred embodiments of the present invention provide a two-wheeled motor vehicle that reduces belt slip in a continuously variable transmission even though support by a center stand is released and a rear wheel thus lands while spinning.

A two-wheeled motor vehicle according to a preferred embodiment of the present invention includes an engine and a continuously variable transmission. The continuously variable transmission includes a primary pulley and a second pulley. The primary pulley includes a first sheave and a first oil chamber to hydraulically move the first sheave, to which torque is transmitted from the engine. The secondary pulley includes a second sheave and a second oil chamber to hydraulically move the second sheave, to which the torque is transmitted from the primary pulley via a belt. The two-wheeled motor vehicle further includes a control device to change oil pressure generated in the first oil chamber and the second oil chamber to thereby control the speed reduction ratio of the continuously variable transmission; a driving wheel to which the torque is transmitted from the secondary pulley; and a center stand. The center stand moves between a support position with a vehicle body supported with the driving wheel floating above the ground and a release position with the support released. The control device further includes a stand position obtaining unit that obtains position information of the center stand; and an add-at-support-position unit that increases the oil pressure generated in the respective oil chambers by a predetermined amount when the center stand is at the support position.

According to various preferred embodiments of the present invention, as the oil pressure in each oil chamber increases when the center stand is at the support position, it is possible to prevent the occurrence of belt slip even though the support by the center stand is released and the rear wheel thus lands while spinning.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 6 is a schematic diagram showing a modified example of a preferred embodiment of the present invention.

DETAILED DESCRIPTION OF THE PREFERRED EMBODIMENTS

Figure 1:
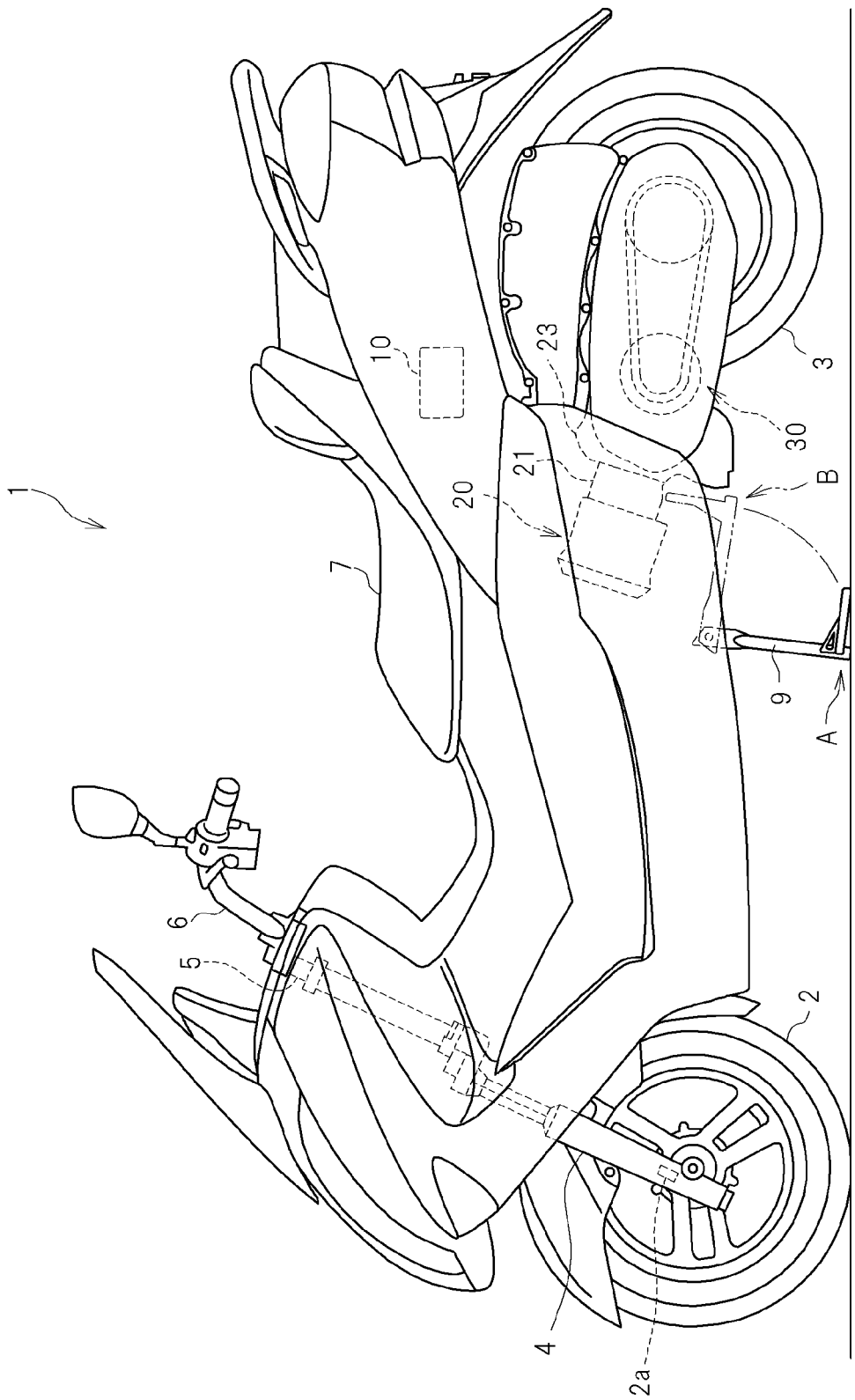
FIG. 1 is a side view of a two-wheeled motor vehicle according to a preferred embodiment of the present invention.
Figure 2:
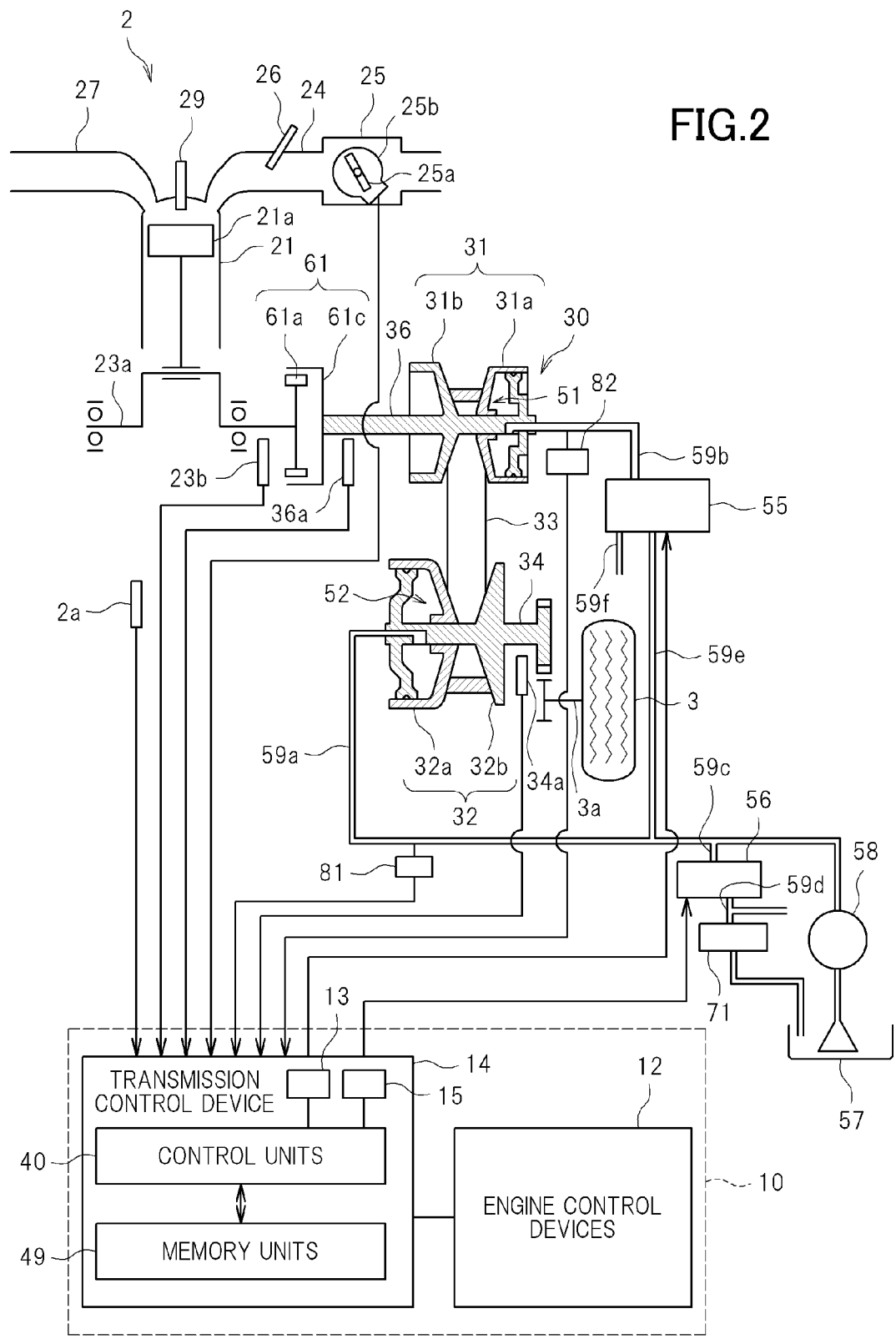
FIG. 2 is a schematic diagram showing an engine, a continuously variable transmission, a control device, and a hydraulic circuit of the two-wheeled motor vehicle shown in FIG. 1.

In the following, preferred embodiments of the present invention will be described with reference to the accompanying drawings. FIG. 1 is a side view of a two-wheeled motor vehicle 1, which is an example of a preferred embodiment of the present invention. FIG. 2 is a schematic view showing a control device 10, an engine 20, a continuously variable transmission 30, and a hydraulic circuit 50 of the two-wheeled motor vehicle 1.

As shown in FIG. 1 or 2, the two-wheeled motor vehicle 1 preferably includes a front wheel 2, which is a following wheel, and a rear wheel 3, which is a driving wheel. The two-wheeled motor vehicle 1 further includes an engine 20, a continuously variable transmission 30 to reduce the rotation speed of the engine 20 and transmit a rotation force to the rear wheel 3, a control device 10 arranged and programmed to control the engine 20 and the continuously variable transmission 30, and a hydraulic circuit 50. A center stand 9 is provided on a lower portion of the two-wheeled motor vehicle 1. The center stand 9 can move between a support position A where the vehicle body is supported with the rear wheel 3 floating above the ground and a release position B where the support is released.

As shown in FIG. 1, the front wheel 2 is attached to the lower end of the front suspension 4 so as to rotate. A steering shaft 5 is attached to an upper portion of the front suspension 4 so as to rotate in the left and right directions. A handle 6 is provided to an upper portion of the steering shaft 5. The handle 6, the steering shaft 5, the front suspension 4, and the front wheel 2 are arranged so as to integrally rotate in the left and right directions. Operating the handle 6 enables steering the front wheel 2. An accelerator grip (not shown) is provided on the right side of the handle 6 to be operated by a passenger.

As shown in FIG. 1, a seat 7 is mounted behind the handle 6 so that a passenger can straddle the seat 7 to sit thereon. The engine 20 is mounted below the seat 7. The engine 20 includes a cylinder 21 and a crankcase 23. As shown in FIG. 2, a suction pipe 24 is connected to the cylinder 21. The suction pipe 24 includes a fuel supply device 26 that feeds fuel in a fuel tank (not shown) to the cylinder 21. The fuel supply device 26 may be, e.g., an electronically controlled fuel injection system that is controlled by the control device 10. The fuel supply device 26 may be a carburetor, for example.

A throttle body 25 is connected to the suction pipe 24, wherein a throttle valve 25a that adjusts the amount of air flowing through the suction pipe 24 is formed inside the throttle body 25. The air having flown through the throttle body 25 flows further into the cylinder 21 via the suction pipe 24. The throttle valve 25a may be, e.g., an electronically controlled valve that is actuated by an actuator that is controlled by the control device 10 or a valve that is connected via a wire to and operates in connection with the accelerator grip provided to the handle 6.

Inside the cylinder 21 is provided a piston 21a that reciprocatingly moves as the fuel ignited by the ignition plug 29 burns. The piston 21a is connected to the crankshaft 23a so that the crankshaft 23a rotates as the piston 21a reciprocatingly moves which causes the engine 20 to output torque. An emission pipe 27 that emits exhaust gas produced by the fuel burning is connected to the cylinder 21.

Upstream of the continuously variable transmission 30 in the torque transmission path between the engine 20 and the continuously variable transmission 30, that is, from the engine 20 to the rear wheel 3 is provided a clutch 61 that transmits the torque output from the engine 20 to the continuously variable transmission 30 or reducing torque transmission to the continuously variable transmission 30. The clutch 61 preferably is a centrifugal clutch that is automatically connected or disconnected according to the rotation speed of the engine 20. In this example, the clutch 61 includes a driving member 61a that rotates integrally with the crankshaft 23a and a driven member 61c that rotates integrally with a primary shaft 36 provided to the continuously variable transmission 30. The driving member 61a moves in the radial direction due to a centrifugal force to contact with the driven member 61c. The driven member 61c rotates integrally with the driving member 61a due to a friction force between itself and the driving member 61a, whereby the torque from the engine 20 is transmitted via the clutch 61 to the primary shaft 36.

The continuously variable transmission 30 is a belt-type continuously variable transmission, and preferably includes a primary pulley 31 that rotates integrally with the primary shaft 36 and a secondary pulley 32 that is provided to and rotates integrally with the secondary shaft 34. The continuously variable transmission 30 includes an annular belt 33 that is wound around the primary pulley 31 and the secondary pulley 32 to transmit the rotation of the primary pulley 31 to the secondary pulley 32. The belt 33 preferably is, e.g., a metallic belt or a resin belt.

The primary pulley 31 includes a movable sheave (first sheave) 31a provided so as to move in the axial direction of the primary shaft 36 and a stationary sheave 31b provided so as to be opposed to the movable sheave 31a in the axial direction. The secondary pulley 32 also includes a movable sheave (second sheave) 32a provided so as to move in the axial direction of the secondary shaft 34 and a stationary sheave 32b provided so as to be opposed to the movable sheave 32a in the axial direction.

The movable sheaves 31a, 32a move in the axial direction and the respective intervals between the movable sheaves 31a, 32a and the stationary sheave 31b, 32b are accordingly changed, whereby the speed reduction ratio of the continuously variable transmission 30 is changed. The speed reduction ratio of the continuously variable transmission 30 is changed between a speed reduction ratio with the movable sheave 31a positioned closest to the stationary sheave 31b and the movable sheave 32a positioned farthest from the stationary sheave 32b (hereinafter referred to as "top", or the minimum speed reduction ratio) and a speed reduction ratio with the movable sheave 31a positioned farthest from the stationary sheave 31b and the movable sheave 32a positioned closest to the stationary sheave 32b (hereinafter referred to as "low", or the maximum speed reduction ratio).

The secondary shaft 34 is connected to the wheel shaft of the rear wheel 3 via a gear, so that the rotation transmitted from the primary pulley 31 to the secondary pulley 32 is further transmitted from the secondary shaft 34 to the wheel shaft of the rear wheel 3 via the gear.

The continuously variable transmission 30 is a continuously variable transmission of which speed reduction ratio is controlled by oil pressure. The primary pulley 31 includes a first oil chamber (hereinafter referred to as a primary oil chamber) 51 to which hydraulic oil is supplied from the second oil passage 59b, while the secondary pulley 32 has a second oil chamber (hereinafter referred to as a secondary oil chamber) 52 to which hydraulic oil is supplied from the first oil passage 59a. The movable sheave 31a moves in the axial direction due to the oil pressure of the primary oil chamber 51 to sandwich the belt 33 together by the stationary sheave 31b due to the oil pressure. Meanwhile, the movable sheave 32a moves in the axial direction due to the oil pressure of the secondary oil chamber 52 to sandwich the belt 33 together by the stationary sheave 32b due to the oil pressure.

The hydraulic circuit 50 preferably is a circuit that generates oil pressure in the primary oil chambers 51, 52 according to an electric signal input from the transmission control device 14. In this example, the hydraulic circuit 50 includes a shift control valve 55 and a clamp force control valve 56. The shift control valve 55 includes a solenoid valve that operates according to a current supplied from the transmission control device 14 and a pressure reducing valve that operates according to a signal pressure output from the solenoid valve. The clamp force control valve 56 includes a solenoid valve that operates according to a current supplied from the transmission control device 14 and a relief valve that operates according to a signal pressure output from the solenoid valve.

An oil pump 58 is provided so as to operate in connection with the rotation of the engine 20, and sucks hydraulic oil in the oil sump 57 and supplies oil to the first oil passage 59a. The first oil passage 59a is connected to the secondary oil chamber 52 and also to the clamp force control valve 56 via an oil passage 59c. To the clamp force control valve 56 are connected an oil passage 59d connected to a lubrication path to lubricate the respective units of the engine 20, and a lubrication path adjusting valve 71 to adjust the oil pressure in the lubrication path. The clamp force control valve 56 introduces hydraulic oil from the first oil passage 59a, and adjusts the amount of hydraulic oil to be discharged to the oil passage 59c such that the oil pressure (line pressure) of the first oil passage 59a and that of the secondary oil chamber 52 become equal to an oil pressure according to the current supplied from the transmission control device 14.

The shift control valve 55 is connected via an oil passage 59e to the first oil passage 59a and also via the second oil passage 59b to the primary oil chamber 51. An exhaust path 59f is connected to the shift control valve 55. The shift control valve 55 reduces the oil pressure, that is, line pressure, of the first oil passage 59a, and generates oil pressure according to a current input from the transmission control device 14 in the primary oil chamber 51. That is, the shift control valve 55 feeds hydraulic oil fed from the first oil passage 59a via the oil passage 59e to the second oil passage 59b or exhausts hydraulic oil fed from the second oil passage 59b to the exhaust path 59f so that the oil pressure in the primary oil chamber 51 becomes an oil pressure according to a current input from the transmission control device 14.

On the throttle body 25, a throttle sensor 25b to determine a throttle opening is provided. The throttle sensor 25b preferably includes, e.g., a potentiometer, and outputs an electric signal according to a throttle opening. The engine 20 includes an engine rotation speed sensor 23b that outputs a signal having a frequency according to the rotation speed of the crankshaft 23a. The continuously variable transmission 30 includes a primary rotation speed sensor 36a that outputs a signal having a frequency according to the rotation speed of the primary shaft 36 and a secondary rotation speed sensor 34a that outputs a signal having a frequency according to the rotation speed of the secondary shaft 34. On the lower end of the front suspension 4 shown in FIG. 1, a front wheel rotation speed sensor 2a that outputs a signal having a frequency according to the rotation speed of the front wheel 2 is provided. The engine rotation speed sensors 23b, primary rotation speed sensor 36a, secondary rotation speed sensor 34a, and front wheel rotation speed sensor 2a preferably are respectively provided by a rotation sensor including, e.g., an electromagnetic pickup and a magnetic resistive element. Further, an oil pressure sensor 81 including a diaphragm or a piezo element that outputs an electric signal according to the oil pressure of the first oil passage 59a is provided to the first oil passage 59a, and an oil pressure sensor 82 similarly including a diaphragm or a piezo element that outputs an electric signal according to the oil pressure of the second oil passage 59b is provided to the second oil passage 59b.

The control device 10 includes a transmission control device 14 and valve driving circuits 13, 15. The transmission control device 14 includes a memory unit 49 including a RAM (Random Access Memory) and a ROM (Read Only Memory), a microprocessor, and the control unit 40 that executes a program stored beforehand in the memory unit 49. In the memory unit 49, a map and a threshold for use in a process carried out by the control unit 40 are stored beforehand in addition to the program to be executed by the control unit 40.

Output signals from the engine rotation speed sensor 23b, the primary rotation speed sensor 36a, and the secondary rotation speed sensor 34a are input to the control unit 40. The control unit 40 calculates an engine rotation speed, a rotation speed of the primary shaft 36 (hereinafter referred to as a primary rotation speed), and that of the secondary shaft 34 (hereinafter referred to as a secondary rotation speed), based on the signals from these sensors.

An output signal from the front wheel rotation speed sensor 2a is also input to the control unit 40. The control unit 40 calculates the rotation speed of the front wheel 2 (hereinafter referred to as a front wheel rotation speed), based on the output signal (a function as a front wheel rotation speed obtaining unit 47 to be described later). Further, the control unit 40 multiplies the secondary rotation speed by a gear ratio between the secondary shaft 34 and the wheel shaft of the rear wheel 3 to thereby calculate the rotation speed (a rear wheel rotation speed) of the rear wheel 3 (a function as a wheel rotation speed obtaining unit 48 to be described later). Still further, the control unit 40 is supplied with output signals from the oil pressure sensors 81, 82 and the throttle sensor 25b. The control unit 40 determines the oil pressure of the primary oil chamber 51 (hereinafter referred to as a primary pressure), that of the secondary oil chamber 52 (hereinafter referred to as a secondary pressure), and a throttle opening, based on the output signals from these sensors. Based on these data, the control unit 40 actuates the shift control valve 55 and the clamp force control valve 56 to control the continuously variable transmission 30. Control by the control unit 40 will be described later in detail. Note that the respective sensors are connected to the control unit 40 via an interface circuit (not shown) including an A/D converter, or the like, so that an output signal from each sensor is converted in the interface circuit into a signal that can be processed by the control unit 40 before being supplied to the control unit 40.

The valve driving circuit 13 supplies a current according to a signal input from the control unit 40 to a solenoid valve constituting the shift control valve 55 to thereby activate the shift control valve 55. The valve driving circuit 15 supplies a current according to a signal input from the control unit 40 to a solenoid valve constituting the clamp force control valve 56 to thereby activate the clamp force control valve 56.

Note that, in this example, the control device 10 preferably includes an engine control device 12 connected thereto via a bus. The engine control device 12 as well is supplied with an output signal from the throttle sensor 25b, the engine rotation speed sensor 23b, and so forth, via a signal line (not shown). The engine control device 12 controls an ignition time for the ignition plug 29 and the amount of fuel to be injected by the fuel supply device 26, based on these data.

Figure 3:
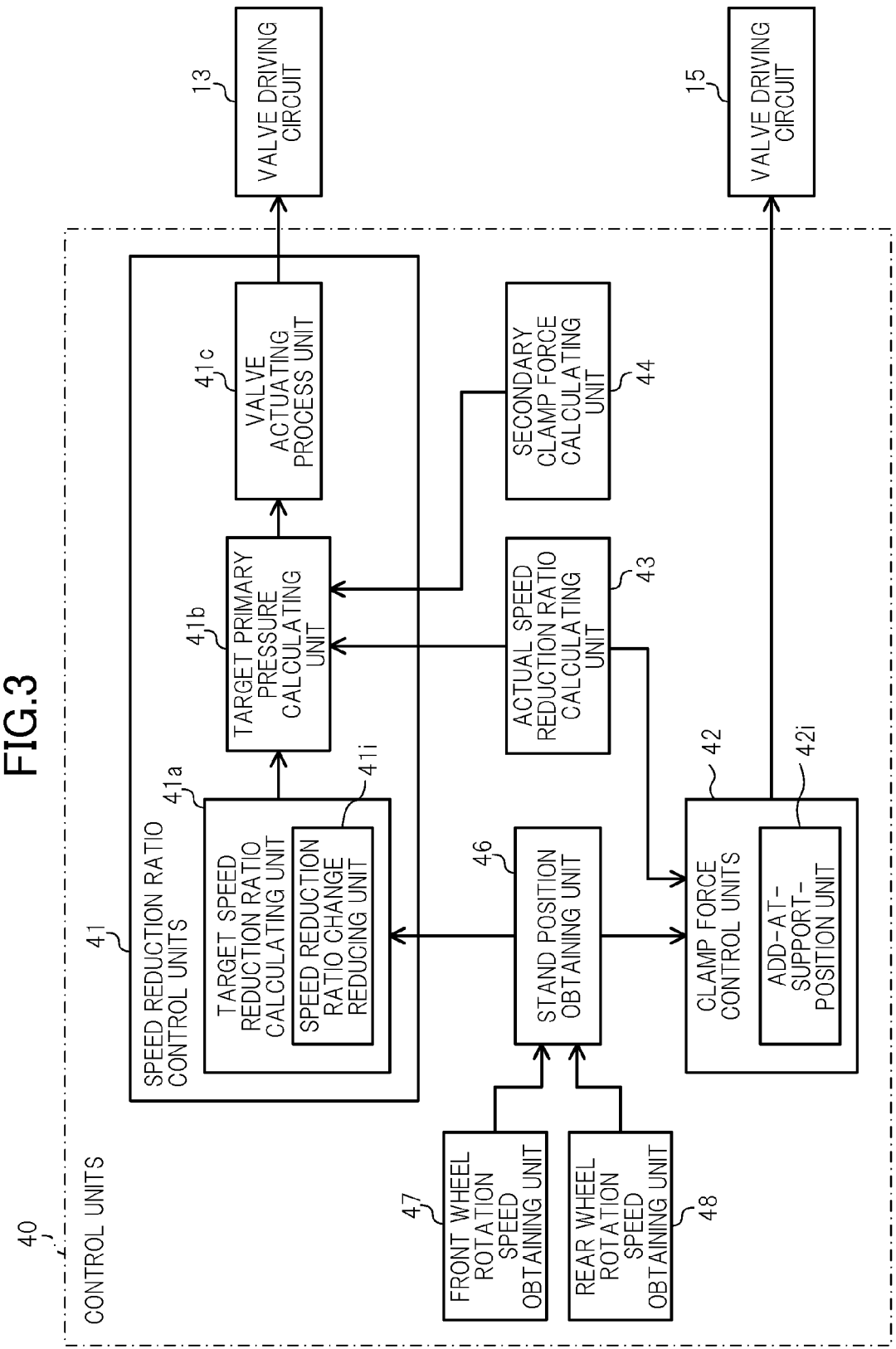
FIG. 3 is a functional block diagram of a control unit of a transmission control device of the control device shown in FIG. 2.

FIG. 3 is a block diagram showing functions of the control unit 40 of the transmission control device 14. As shown in the diagram, the control unit 40 preferably includes a speed reduction ratio control unit 41 and a clamp force control unit 42. The speed reduction ratio control unit 41 actuates the shift control valve 55 to change a clamp force (a force with which the movable sheave 31a and the stationary sheave 31b sandwich the belt 33) of the primary pulley 31 to thereby control the speed reduction ratio. The clamp force control unit 42 actuates the clamp force control valve 56 to generate an oil pressure in the first oil passage 59a and the secondary oil chamber 52 that is enough to prevent slip of the belt 33. The control unit 40 preferably includes an actual speed reduction ratio calculating unit 43, a secondary clamp force calculating unit 44, a front wheel rotation speed obtaining unit 47, and a rear wheel rotation speed obtaining unit 48.

The actual speed reduction ratio calculating unit 43 calculates a speed reduction ratio of the continuously variable transmission 30. In this example, the actual speed reduction ratio calculating unit 43 calculates a speed reduction ratio of the continuously variable transmission 30, based on a secondary rotation speed determined by the secondary rotation speed sensor 34a (hereinafter referred to as a secondary rotation speed Sspd) and a primary rotation speed determined by the primary rotation speed sensor 36a (hereinafter referred to as an actual primary rotation speed Pspd).

The secondary clamp force calculating unit 44 calculates a clamp force of the secondary pulley 32 (hereinafter referred to as a secondary clamp force Fs). Specifically, as the secondary clamp force Fs includes a clamp force generated according to a secondary pressure and a clamp force generated due to a centrifugal force of the hydraulic oil in the secondary oil chamber 52, the secondary clamp force calculating unit 44 calculates the secondary clamp force Fs, based on, e.g., the oil pressure determined by the oil pressure sensor 81 (hereinafter referred to as an actual secondary pressure Ps) and the secondary rotation speed Sspd.

The stand position obtaining unit 46 determines whether or not the center stand 9 is at the support position A. A determination method will be described later in detail. Here, when the center stand 9 is not at the support position A, that is, when the rear wheel 3 is in contact with the ground, the speed reduction ratio control unit 41 and the clamp force control unit 42 carry out a normal process to be described below. Meanwhile, when the center stand 9 is at the support position A, that is, when the rear wheel 3 is not in contact with but floating above the ground, the speed reduction ratio control unit 41 and the clamp force control unit 42 carry out an add-at-support-position process and a speed reduction ratio change reducing process to be described later.

The clamp force control unit 42 in normal processing controls the oil pressure of the first oil passage 59a and that of the secondary oil chamber 52, based on a torque output from the engine (hereinafter referred to as an engine torque T) and a speed reduction ratio (hereinafter referred to as an actual speed reduction ratio Rt) calculated by the actual speed reduction ratio calculating unit 43. This process by the clamp force control unit 42 is carried out as follows, for example.

That is, initially, the clamp force control unit 42 calculates the engine torque T, based on a throttle opening (hereinafter referred to as a throttle opening Th) determined by the throttle sensor 25b and an engine rotation speed (hereinafter referred to as an engine rotation speed Espd) determined by the engine rotation speed sensor 23b. Then, the clamp force control unit 42 calculates a target clamp force of the secondary pulley 32 (hereinafter referred to as a target secondary clamp force Fs-tg), based on the engine torque T and the actual speed reduction ratio Rt. Specifically, for example, with reference to a map and a relational expression stored in the memory unit 49, the clamp force control unit 42 calculates a target secondary clamp force Fs-tg corresponding to the engine torque T and the actual speed reduction ratio Rt. Then, the clamp force control unit 42 calculates a target secondary pressure Ps-tg, based on the target secondary clamp force Fs-tg calculated as described above. Further, the clamp force control unit 42 supplies a current from the valve driving circuit 15 to a solenoid constituting the clamp force control valve 56 such that the actual secondary pressure Ps becomes equal to the target secondary pressure Ps-tg. The clamp force control unit 42 repetitively carries out the process described above in a predetermined cycle after activation of the transmission control device 14. Consequently, the secondary pressure and the oil pressure of the first oil passage 59a gradually changes according to changes in the throttle opening Th and the actual speed reduction ratio Rt.

The speed reduction ratio control unit 41 in normal processing sets a target speed reduction ratio (hereinafter referred to as a target speed reduction ratio Rt-tg), based on an operating condition, including the throttle opening Th, the secondary rotation speed Sspd, and so forth, and controls the speed reduction ratio such that the actual speed reduction ratio Rt becomes equal to the target speed reduction ratio Rt-tg. As shown in FIG. 3, the speed reduction ratio control unit 41 preferably includes a target speed reduction ratio calculating unit 41a, a target primary pressure calculating unit 41b, and a valve actuating process unit 41c.

The target speed reduction ratio calculating unit 41a calculates the target speed reduction ratio Rt-tg, based on the throttle opening Th, the secondary rotation speed Sspd, and a vehicle speed (hereinafter referred to as a vehicle speed V) calculated based on an output signal from the secondary rotation speed sensor 34a. Specifically, for example, with reference to a relational expression and a map (hereinafter referred to as a shift control map) correlating a throttle opening, a vehicle speed, and a primary rotation speed, the target speed reduction ratio calculating unit 41a calculates a target primary rotation speed Pspd-tg corresponding to the throttle opening Th and the vehicle speed V, and then divides the target primary rotation speed Pspd-tg by the secondary rotation speed Sspd to thereby calculate the target speed reduction ratio Rt-tg.

The target primary pressure calculating unit 41b calculates a target primary pressure (hereinafter referred to as a target primary pressure Pp-tg), based on the actual speed reduction ratio Rt and the target speed reduction ratio Rt-tg. This process by the target primary pressure calculating unit 41b will be carried out as described below, for example.

That is, the target primary pressure calculating unit 41b initially calculates a speed with respect to which a speed reduction ratio should be changed (hereinafter referred to as a shift speed Drt), based on the difference between the actual speed reduction ratio Rt and the target speed reduction ratio Rt-tg. For example, with reference to a relational expression and a map (hereinafter referred to as a shift speed map) correlating the difference between the actual speed reduction ratio and the target speed reduction ratio and a shift speed, the target primary pressure calculating unit 41b calculates a shift speed Drt corresponding to the difference between the actual speed reduction ratio Rt calculated by the actual speed reduction ratio calculating unit 43 and the target speed reduction ratio Rt-tg calculated by the target speed reduction ratio calculating unit 41a. Then, the target primary pressure calculating unit 41b adds or subtracts a force in accordance with the shift speed Drt with respect to the clamp force of the primary pulley 31 that is necessary to maintain the current speed reduction ratio to determine a resultant value as a target clamp force (hereinafter referred to as a target primary clamp force Fp-tg) of the primary pulley 31.

For example, the target primary pressure calculating unit 41b calculates the target primary clamp force Fp-tg, using the expression (1) below.

$$Fp\text{-}tg = Fpk - Drt/k \cdot Pspd \tag{1}$$

wherein Fpk refers to a clamp force of the primary pulley 31 that is necessary to maintain the current speed reduction ratio. Fpk is, e.g., a product (Fs×Rf) of the ratio between the above described clamp force of the secondary pulley 32 and that of the primary pulley 31 (hereinafter referred to as a thrust force ratio Rf). Referring to the map and relational expression, the target primary pressure calculating unit 41b calculates a thrust force ratio Rf corresponding to the actual speed reduction ratio Rt calculated by the actual speed reduction ratio calculating unit 43. Then, the target primary pressure calculating unit 41b calculates the target primary clamp force Fp-tg, based on the thrust force ratio Rf and the secondary clamp force Fs, or a clamp force calculated by the secondary clamp force calculating unit 44. Where k is a coefficient determined according to the speed reduction ratio and the primary rotation speed, the target primary pressure calculating unit 41b calculates a coefficient k corresponding to the actual speed reduction ratio Rt and the primary rotation speed Pspd, referring to the map, wherein Pspd is a primary rotation speed determined by the primary rotation speed sensor 36a, as described above.

Based on the target primary clamp force Fp-tg calculated as described above, the target primary pressure calculating unit 41b calculates a target primary pressure Pp-tg. For example, as a clamp force of the primary pulley 31 includes a centrifugal force generated due to rotation of the hydraulic oil in the primary oil chamber 51, the target primary pressure calculating unit 41b calculates the target primary pressure Pp-tg, based on the primary rotation speed Pspd and the pressure receiving area of the primary pulley 31 (the area of a portion of the movable sheave 31a that receives the oil pressure).

The valve actuating process unit 41c controls a current supplied from the valve driving circuit 13 to the shift control valve 55 such that the oil pressure of the primary oil chamber 51 to be determined by the oil pressure sensor 82 (hereinafter referred to as an actual primary pressure Pp) becomes equal to the target primary pressure Pp-tg. Specifically, the valve actuating process unit 41c calculates an instruction value, based on the difference between the target primary pressure Pp-tg and the actual primary pressure Pp, and outputs the instruction value to the valve driving circuit 13. In return, the valve driving circuit 13 supplies a current of a value according to the instruction value to the shift control valve 55. As a result of this process by the valve actuating process unit 41c, the difference between the target primary pressure Pp-tg and the actual primary pressure Pp is eliminated, and the actual speed reduction ratio Rt becomes closer to the target speed reduction ratio Rt-tg.

The target primary pressure calculating unit 41b repetitively carries out the above described process during shifting to thereby sequentially update the target primary pressure Pp-tg. That is, every time the actual speed reduction ratio Rt is changed toward the target speed reduction ratio Rt-tg, the target primary pressure calculating unit 41b newly calculates the target primary pressure Pp-tg, based on the difference between the changed actual speed reduction ratio Rt and the target speed reduction ratio Rt-tg. Then, the valve actuating process unit 41c outputs an instruction value calculated based on the difference between the newly calculated target primary pressure Pp-tg and the actual primary pressure Pp to the valve driving circuit 13. Consequently, the actual speed reduction ratio Rt becomes much closer to the target speed reduction ratio Rt-tg.

With the difference eliminated between the actual speed reduction ratio Rt and the target speed reduction ratio Rt-tg, the shift speed Drt calculated based on the difference between the actual speed reduction ratio Rt and the target speed reduction ratio Rt-tg becomes zero. As a result, the target primary pressure calculating unit 41b calculates an oil pressure corresponding to the clamp force Fpk of the primary pulley 31 that is necessary to maintain the speed reduction ratio as the target primary pressure Pp-tg. Consequently, the actual speed reduction ratio Rt is maintained at the target speed reduction ratio Rt-tg.

Figure 4:
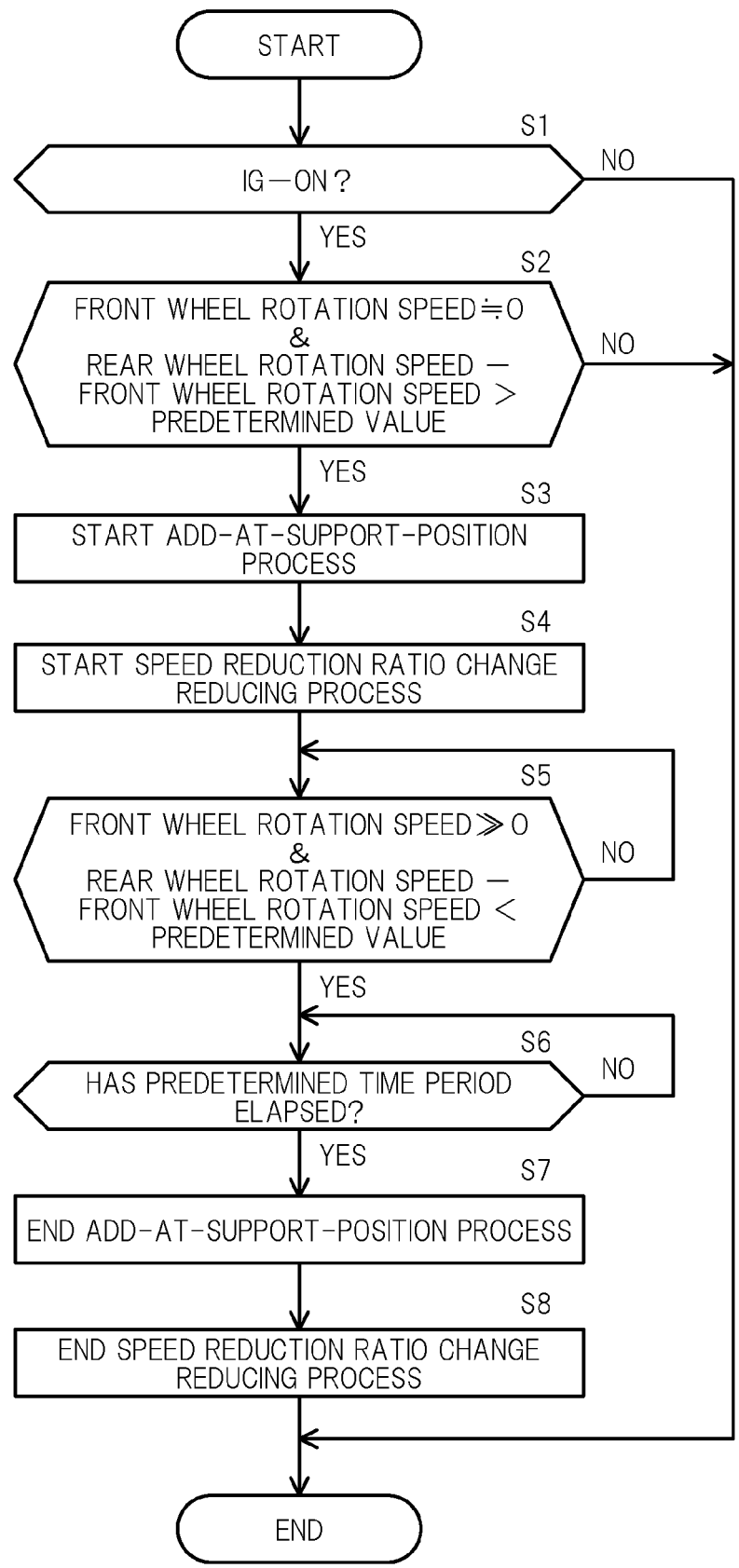
FIG. 4 is a flowchart of an example of a process carried out by the control unit shown in FIG. 2.

In the following, a process to be carried out when the center stand 9 is at the support position A will be described. As shown in FIG. 1, when the center stand 9 is at the support position A, the rear wheel 3 is floating above the ground. If a passenger operates the acceleration grip of the handle 6 in such a condition, torque from the engine 20 is transmitted via the clutch 61 and the continuously variable transmission 30 to the rear wheel 3, which will resultantly spin. When the support by the center stand 9 is then released and the rear wheel 3 accordingly lands while spinning, an abrupt change is caused to the torque in the torque transmission path to the rear wheel 3, and the belt 33 may thus possibly slip relative to the primary pulley 31 and the secondary pulley 32 in the continuously variable transmission 30. In view of the above, when the center stand 9 is at the support position A, an add-at-support-position unit 42i of the clamp force control unit 42 carries out an add-at-support-position process to enhance the clamp force of the secondary pulley 32 to thereby prevent the belt 33 from slipping. Further, the speed reduction ratio change reducing unit 41i of the speed reduction ratio control unit 41 carries out a speed reduction ratio change reducing process to thereby prevent changes in the speed reduction ratio of the continuously variable transmission 30. FIG. 4 is a flowchart of an example process carried out by the control unit 40.

Initially, the stand position obtaining unit 46 determines whether or not the engine 20 is carrying out ignition control (S1). Information concerning whether or not the engine 20 is carrying out ignition control is obtained from the engine control device 12. Thereafter, the stand position obtaining unit 46 determines whether or not the center stand 9 is at the support position A (S2). In this preferred embodiment, whether or not the center stand 9 is at the support position A is determined based on whether or not the rear wheel 3 is spinning. That is, because the rear wheel 3 spins when the center stand 9 is at the support position A and the rear wheel 3 is thus floating above the ground, determination as to whether or not the rear wheel 3 is spinning is utilized in determination as to whether or not the center stand 9 is at the support position A in this preferred embodiment. Further, determination as to whether or not the rear wheel 3 is spinning is made by determining, based on the front wheel rotation speed obtained by the front wheel rotation speed obtaining unit 47 and the rear wheel rotation speed obtained by the rear wheel rotation speed obtaining unit 48, whether or not a first condition that the front wheel rotation speed is close to zero and a second condition that the difference between the rear wheel rotation speed and the front wheel rotation speed is equal to or larger than a predetermined value (positive value) are both satisfied. That is, because the front wheel 2 usually remains stopped when the rear wheel 3 spins, a determination as to whether or not the rear wheel 3 is spinning is made based on these two conditions. In detail, a determination as to whether or not the first condition is satisfied is made based on whether or not the front wheel rotation speed is smaller than a threshold that is slightly larger than zero. Alternatively, a determination as to whether or not the rear wheel 3 is spinning may be made based on the second condition alone. Note that the above described manners are not limiting, and determination as to whether or not the center stand 9 is at the support position A may be made, for example, with a stand sensor being provided to output a sensing signal in accordance with the position of the center stand 9, based on a sensing signal output from the stand sensor.

Figure 5:
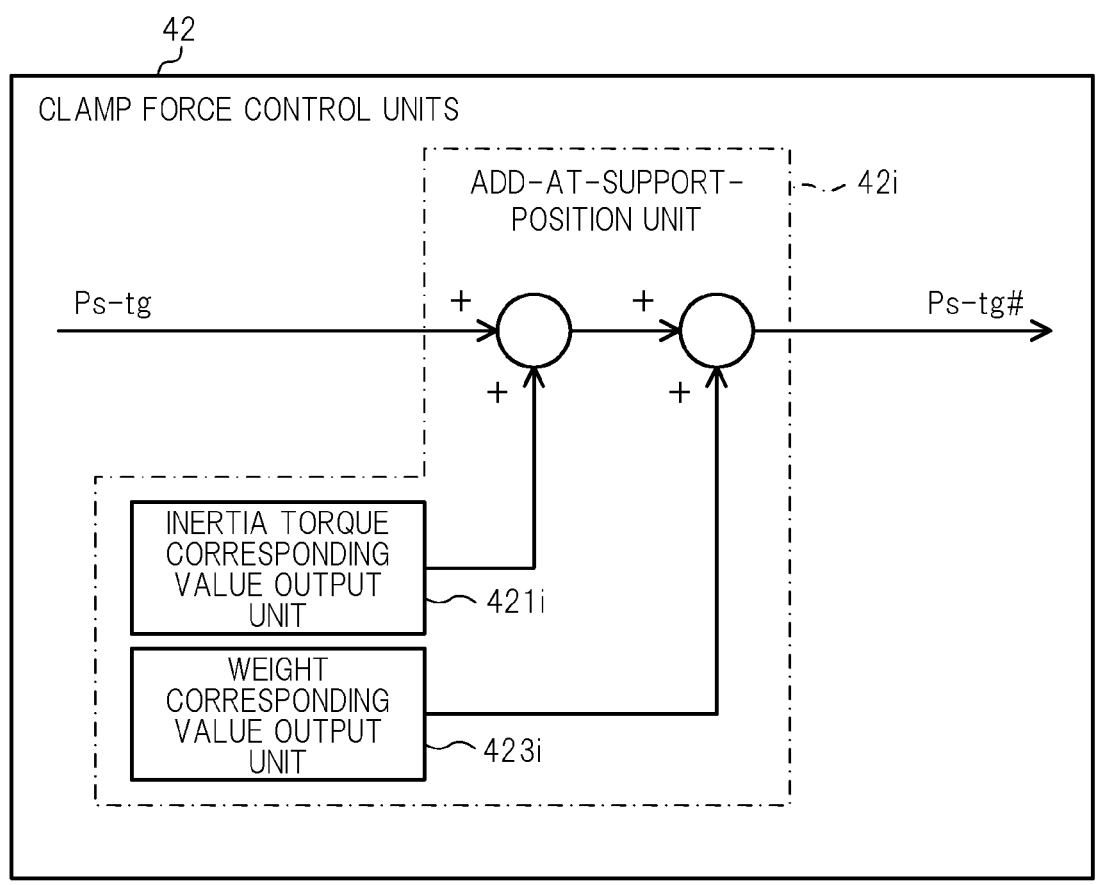
FIG. 5 is a functional block diagram of a clamp force control unit of the described control unit shown in FIG. 2.

Thereafter, when the center stand 9 is at the support position A (S2: YES), the add-at-support-position unit 42i of the clamp force control unit 42 starts an add-at-support-position process to enhance the clamp force of the secondary pulley 32 (S3). FIG. 5 is a functional block diagram of the clamp force control unit 42. The add-at-support-position unit 42i calculates the target secondary pressure Ps-tg similar to the above described normal processing, and adds a predetermined value (a positive value) to the target secondary pressure Ps-tg to thereby correct the target secondary pressure Ps-tg (hereinafter referred to as a corrected target secondary pressure Ps-tg#). Thereafter, the clamp force control unit 42 supplies a current from the valve driving circuit 15 to the solenoid of the clamp force control valve 56 such that the actual secondary pressure Ps becomes equal to the corrected target secondary pressure Ps-tg#. With the above, the clamp force of the secondary pulley 32 increases more in the above described normal processing. Note that although a predetermined value is preferably added to the target secondary pressure Ps-tg in this preferred embodiment, this is not limiting, and a predetermined value may be added to the target secondary clamp force Fs-tg instead. As described above, the target primary pressure calculating unit 41b of the speed reduction ratio control unit 41 calculates the target primary clamp force Fp-tg, based on the secondary clamp force Fs calculated by the secondary clamp force calculating unit 44, and further calculates the target primary pressure Pp-tg. Therefore, the clamp force of the primary pulley 31 will increase more in normal processing as the clamp force of the secondary pulley 32 increases. As clamp forces of the primary pulley 31 and the secondary pulley 32 both increase in this manner, the belt 33 can be prevented from slipping.

Specifically, the add-at-support-position unit 42i has an inertia torque corresponding value output unit 421i and a weight corresponding value output unit 423i, wherein the inertia torque corresponding value output unit 421i outputs a predetermined value to be added to the target secondary pressure Ps-tg. The inertia torque corresponding value output unit 421i outputs a predetermined value in accordance with the inertia torque in the torque transmission path (hereinafter referred to as an upstream transmission path) from the engine 20 to the primary pulley 31 of the continuously variable transmission 30. That is, when the rear wheel 3 lands while spinning, torque in the opposite direction is applied to the torque transmission path from the secondary pulley 32 of the continuously variable transmission 30 to the rear wheel 3 (hereinafter referred to as a downstream transmission path), while torque in the forward direction remains in the upstream transmission path. Therefore, the inertia torque in the upstream transmission path is applied to the belt 33 of the continuously variable transmission 30 when the rear wheel 3 lands while spinning. In view of the above, the inertia torque corresponding value output unit 421i adds a value that compensates for slip of the belt 33 due to such an inertia torque to the target secondary pressure Ps-tg, to thereby prevent the belt 33 from slipping.

Further, the weight corresponding value output unit 423i outputs a value in accordance with the weight applied to the rear wheel 3. That is, when the rear wheel 3 lands while spinning, a torque in magnitude in accordance with the weight applied to the rear wheel and in the opposite direction is applied to the downstream transmission path. The torque in the opposite direction can prevent the belt 33 from slipping. In this view, the weight corresponding value output unit 423i adds a value to compensate for slip of the belt 33 due to such a torque to the target secondary pressure Ps-tg to thereby prevent the belt 33 from slipping. Note that the weight applied to the rear wheel 3 corresponds to the total of the weight of the vehicle body itself and the weight applied to the vehicle body (a load weight), such as the weight of a passenger. Such a load weight may be, e.g., a fixed value or obtained, based on a sensing signal from a load sensor (load cell) provided to the rear cushion (not shown) of the two-wheeled motor vehicle 1 to output a sensing signal according to the weight applied to the vehicle body (a function of a load obtaining unit).

Thereafter, the speed reduction ratio change reducing unit 41i of the speed reduction ratio control unit 41 starts a speed reduction ratio change reducing process (S4). That is, although the transmission ratio of the continuously variable transmission 30 under normal control is changed from the low side (the maximum speed reduction ratio) to the top side (the minimum speed reduction ratio) when the rear wheel 3 spins, the transmission ratio of the continuously variable transmission 30 in this preferred embodiment is maintained on the low side due to the function of the speed reduction ratio change reducing unit 41i. Specifically, the speed reduction ratio change reducing unit 41i fixes the target speed reduction ratio Rt-tg calculated by the above described target speed reduction ratio calculating unit 41a to a predetermined value on the low side or is maintained such that the target speed reduction ration Rt-tg will not be changed from a predetermined value on the low side to the top side. With the above, the transmission ratio of the continuously variable transmission 30 is kept on the low side during the add-at-support-position process. As described above, with the transmission ratio of the continuously variable transmission 30 kept on the low side, the vehicle can start moving smoothly when the rear wheel 3 lands while spinning. Further, as the movable sheave 32a of the secondary pulley 32 is located relatively close to the stationary sheave 32b when the transmission ratio of the continuously variable transmission 30 is kept on the low side, the belt 33 remains in contact with the secondary pulley 32 by a relatively long distance. This can better prevent the belt 33 from slipping.

While the add-at-support-position process and the speed reduction ratio change reducing process are being carried out, the stand position obtaining unit 46 determines whether or not the support by the center stand 9 is released (S5). Whether or not the support by the center stand 9 is released is determined based on whether or not a condition that the front wheel rotation speed is larger than about zero (a condition opposite in meaning from the above described first condition) and another condition that the difference between the rear wheel rotation speed and the front wheel rotation speed is equal to or smaller than a predetermined value (a condition opposite in meaning from the second condition) are both satisfied. That is, it is determined that the support by the center stand 9 is released when the front wheel 2 and the rear wheel 3 are both rotating. When these conditions are satisfied (S5: YES) and a predetermined period of time thereafter elapses (S6), the add-at-support-position unit 42i and the speed reduction ratio change reduction unit 41i terminate the add-at-support-position process and the speed reduction ratio change reducing process (S7 and S8), whereby a series of processes are terminated.

The above described two-wheeled motor vehicle 1 includes a hydraulic continuously variable transmission 30 that transmits torque via the belt 33. The control device 10 includes the stand position obtaining unit 46 that obtains position information of the center stand 9 and the add-at-support-position unit 42i that increases the oil pressure to be generated in the primary oil chamber 51 and the secondary oil chamber 52 by a predetermined amount when the center stand 9 is at the support position A. With this arrangement, it is possible to prevent the belt 33 from slipping in the continuously variable transmission 30 even when the support by the center stand 9 is released and the rear wheel 3 thus lands while spinning.

The stand position obtaining unit 46 determines that the center stand 9 is at the support position A when the condition that the difference between the rear wheel rotation speed and the front wheel rotation speed is equal to or larger than a predetermined value is satisfied. A condition that the front wheel rotation speed is equal to or smaller than a predetermined value may additionally be taken into consideration. This makes it possible to determine whether or not the center stand 9 is at the support position A without providing a determination unit to directly determine the position of the center stand 9. Further, it is possible to detect spinning of the rear wheel 3, which may cause slip of the belt 33 of the continuously variable transmission 30.

Note that the above described arrangement is not limiting, and a stand sensor 95 that outputs a sensing signal in accordance with the position of the center stand 9 may be provided to the two-wheeled motor vehicle 1, as shown in FIG. 6. FIG. 6 is a schematic diagram showing a modified example of a preferred embodiment of the present invention, in which a structure identical to that described in the above described preferred embodiment is given an identical numeral and a description thereof is omitted. In this modified example, a sensing signal from the stand sensor 95 is input to the control unit 40, and the stand position obtaining unit 46 (see FIG. 3) in the control unit 40 determines whether or not the center stand 9 is at the support position A, based on the sensing signal. This makes it possible to directly determine the position of the center stand 9.

The control unit 40 further preferably includes a speed reduction ratio change reducing unit 41i that reduces changes in the speed reduction ratio of the continuously variable transmission 30 when the center stand 9 is at the support position A. The speed reduction ratio change reducing unit 41i may keep the speed reduction ratio of the continuously variable transmission 30 lower than what is predetermined. With the above, the belt 30 remains in contact with the secondary pulley 32 by a relatively long distance in the continuously variable transmission 30, as described above, so that the belt 33 can be better prevented from slipping.

The add-at-support-position unit 42i of the clamp force control unit 42 may increase the oil pressure generated in the primary oil chamber 51 and the secondary oil chamber 52 by an amount in accordance with the load applied to the vehicle body when the center stand 9 is at the support position A. This can facilitate adjustment of the clamp forces of the primary pulley 31 and the secondary pulley 32 so as to have a necessary magnitude.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A two-wheeled motor vehicle comprising:
   an engine;
   a continuously variable transmission including a primary pulley including a first sheave and a first oil chamber that hydraulically moves the first sheave, to which torque output from the engine is transmitted, and a secondary pulley including a second sheave and a second oil chamber that hydraulically moves the second sheave, to which the torque is transmitted from the primary pulley via a belt;
   a control device arranged and programmed to change oil pressure generated in the first oil chamber and the second oil chamber to thereby control a speed reduction ratio of the continuously variable transmission;
   a driving wheel to which the torque is transmitted from the secondary pulley; and
   a center stand that moves between a support position with a vehicle body supported with the driving wheel floating above the ground and a release position with the center stand released; wherein
   the control device includes:
   a stand position obtaining unit that obtains position information of the center stand; and
   an add-at-support-position unit that increases the oil pressure generated in the first and second oil chambers by a predetermined amount when the center stand is at the support position.

2. The two-wheeled motor vehicle according to claim 1, further comprising a following wheel, wherein the control device further includes:
   a driving wheel rotation speed obtaining unit that obtains a rotation speed of the driving wheel; and
   a following wheel rotation speed obtaining unit that obtains a rotation speed of the following wheel; wherein
   the stand position obtaining unit determines that the center stand is at the support position when a difference between the rotation speed of the driving wheel and the rotation speed of the following wheel is equal to or larger than a predetermined value.

3. The two-wheeled motor vehicle according to claim 2, wherein the stand position obtaining unit determines that the center stand is at the support position when the difference between the rotation speed of the driving wheel and the rotation speed of the following wheel is equal to or larger than the predetermined value and the rotation speed of the following wheel is equal to or smaller than a predetermined value.

4. The two-wheeled motor vehicle according to claim 1, further comprising a stand sensor that outputs a sensing signal in accordance with a position of the center stand, wherein the stand position obtaining unit generates position information on the center stand based on the sensing signal from the stand sensor.

5. The two-wheeled motor vehicle according to claim 1, wherein the control device further includes a speed reduction ratio change reducing unit that reduces changes in a speed reduction ratio of the continuously variable transmission when the control device is at the support position.

6. The two-wheeled motor vehicle according to claim 1, wherein the control device further includes a speed reduction ratio change reducing unit that maintains a speed reduction ratio of the continuously variable transmission lower than a predetermined value when the control device is at the support position.

7. The two-wheeled motor vehicle according to claim 1, wherein the control device further includes a load obtaining unit that obtains information of a load applied to the vehicle body, and the add-at-support-position unit increases the oil pressure generated in the first oil chamber and the second oil chamber by an amount in accordance with the load when the center stand is at the support position.

* * * * *